US009560635B2

(12) United States Patent
Wei et al.

(10) Patent No.: US 9,560,635 B2
(45) Date of Patent: Jan. 31, 2017

(54) APPARATUS AND METHOD TO REDUCE INTERFERENCE BETWEEN FREQUENCY-DIVISION DUPLEX AND TIME-DIVISION DUPLEX SIGNALS IN A COMMUNICATION SYSTEM

(75) Inventors: Na Wei, Beijing (CN); Chun Yan Gao, Beijing (CN); Juho Pirskanen, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 56 days.

(21) Appl. No.: 13/882,813

(22) PCT Filed: Nov. 17, 2010

(86) PCT No.: PCT/IB2010/055232
§ 371 (c)(1),
(2), (4) Date: Jun. 3, 2013

(87) PCT Pub. No.: WO2012/066385
PCT Pub. Date: May 24, 2012

(65) Prior Publication Data
US 2013/0242821 A1    Sep. 19, 2013

(51) Int. Cl.
*H04W 72/04* (2009.01)
*H04B 7/26* (2006.01)

(52) U.S. Cl.
CPC ........... *H04W 72/04* (2013.01); *H04B 7/2615* (2013.01)

(58) Field of Classification Search
CPC . H04B 7/2615; H04B 7/18539; H04B 7/2656; H04W 16/10; H04W 16/06; H04W 16/02; H04W 16/12; H04L 5/0037; H04L 5/001

USPC ......... 370/280, 329, 279, 350; 455/447, 427
See application file for complete search history.

(56) References Cited

U.S. PATENT DOCUMENTS

| 5,448,621 A | * | 9/1995 | Knudsen | 455/427 |
| 5,509,016 A | * | 4/1996 | Muller | 370/350 |
| 6,038,455 A | * | 3/2000 | Gardner et al. | 455/447 |
| 6,839,333 B1 | * | 1/2005 | Åkerberg | 370/330 |

(Continued)

FOREIGN PATENT DOCUMENTS

| CN | 1748377 A | 3/2006 |
| CN | 101778392 A | 7/2010 |

(Continued)

OTHER PUBLICATIONS

European Search Report received for corresponding EP Application No. 10859855.8, dated Mar. 19, 2014, 7 pages.

(Continued)

*Primary Examiner* — David Oveissi
(74) *Attorney, Agent, or Firm* — Harrington & Smith

(57) ABSTRACT

An apparatus, method and system to reduce interference between frequency-division duplex and time-division duplex signals in a communication system. In one embodiment, an apparatus includes a processor (520) and memory (550) including computer program code. The memory (550) and the computer program code are configured to, with the processor (520), cause the apparatus to allocate a time-division duplex carrier for a frequency-division duplex downlink signal for communication with a communication element, and employ the time-division duplex carrier with a truncated time duration for the frequency-division duplex downlink signal.

19 Claims, 10 Drawing Sheets

(56) References Cited

U.S. PATENT DOCUMENTS

| | | | |
|---|---|---|---|
| 2001/0043572 | A1 | 11/2001 | Bilgic et al. |
| 2002/0058513 | A1* | 5/2002 | Klein et al. .................. 455/447 |
| 2003/0043887 | A1* | 3/2003 | Hudson ........................ 375/144 |
| 2004/0082356 | A1* | 4/2004 | Walton et al. ................ 455/522 |
| 2007/0286156 | A1 | 12/2007 | Gormley et al. |
| 2008/0080448 | A1* | 4/2008 | Rottinghaus .................. 370/342 |
| 2009/0180408 | A1* | 7/2009 | Graybeal et al. ............. 370/281 |
| 2009/0185632 | A1* | 7/2009 | Cai et al. ...................... 375/260 |
| 2010/0189069 | A1* | 7/2010 | Sahinoglu et al. ........... 370/330 |
| 2010/0211845 | A1* | 8/2010 | Lee et al. ...................... 714/749 |
| 2010/0290369 | A1* | 11/2010 | Hui ..................... H04B 7/2656 370/279 |
| 2011/0034133 | A1* | 2/2011 | Rofougaran et al. ........... 455/77 |
| 2011/0044259 | A1* | 2/2011 | Nimbalker ............. H04L 5/001 370/329 |
| 2012/0106404 | A1* | 5/2012 | Damnjanovic ............... 370/279 |
| 2012/0250591 | A1* | 10/2012 | Diao et al. .................... 370/280 |
| 2013/0156018 | A1* | 6/2013 | Kim ................... H04W 56/003 370/338 |

FOREIGN PATENT DOCUMENTS

| | | |
|---|---|---|
| EP | 1798873 A1 | 6/2007 |
| WO | 0241520 A2 | 5/2002 |
| WO | 2010049587 A1 | 5/2010 |
| WO | 2011003450 A1 | 1/2011 |

OTHER PUBLICATIONS

International Search Report and Written Opinion received for corresponding Patent Cooperation Treaty Application No. PCT/CN2010/076876, dated Nov. 8, 2011, 13 pages.

3GPP TS 36.300 V8.7.0; "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Dec. 2008; whole document (144 pages).

3GPP TS 25.331 V9.1.0; "3$^{rd}$ Generation Partnership Project; Technical Specification Group Radio Access Network; Radio Resource Control (RRC); Protocol Specification (Release 9)"; Dec. 2009; whole document (266 pages).

3GPP TS 36.331 V9.1.0; "3$^{rd}$ Generation Partnership Project; Technical Specification Group Radio Access Network; Evolved Universal Terrestrial Radio Access (E-UTRA); Radio Resource Control (RRC); Protocol specification (Release 9)"; Dec. 2009; whole document (233 pages).

3GPP TS 32.781 V9.1.0; "3$^{rd}$ Generation Partnership Project; Technical Specification Group Services and System Aspects; Telecommunication management; Home enhanced Node B (HeNB) Subsystem (HeNS); Network Resource Model (NRM); Integration Reference Point (IRP); Requirements (Release 9)"; Mar. 2010; whole document (9 pages).

Xinxi, D. et al.; "Cooperative Communication Based on Spectrum Aggregation in LTE Further Evolution"; ZTE Communications, vol. 8, No. 1; Mar. 2010; whole document (6 pages).

\* cited by examiner

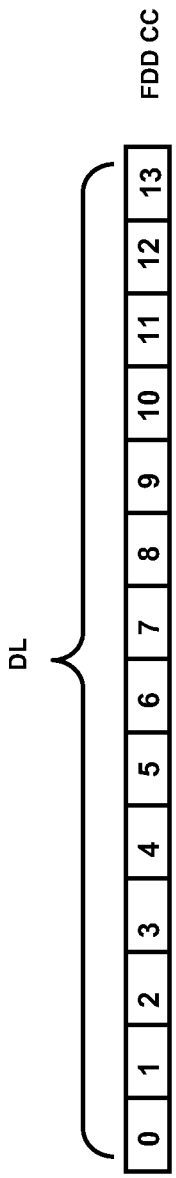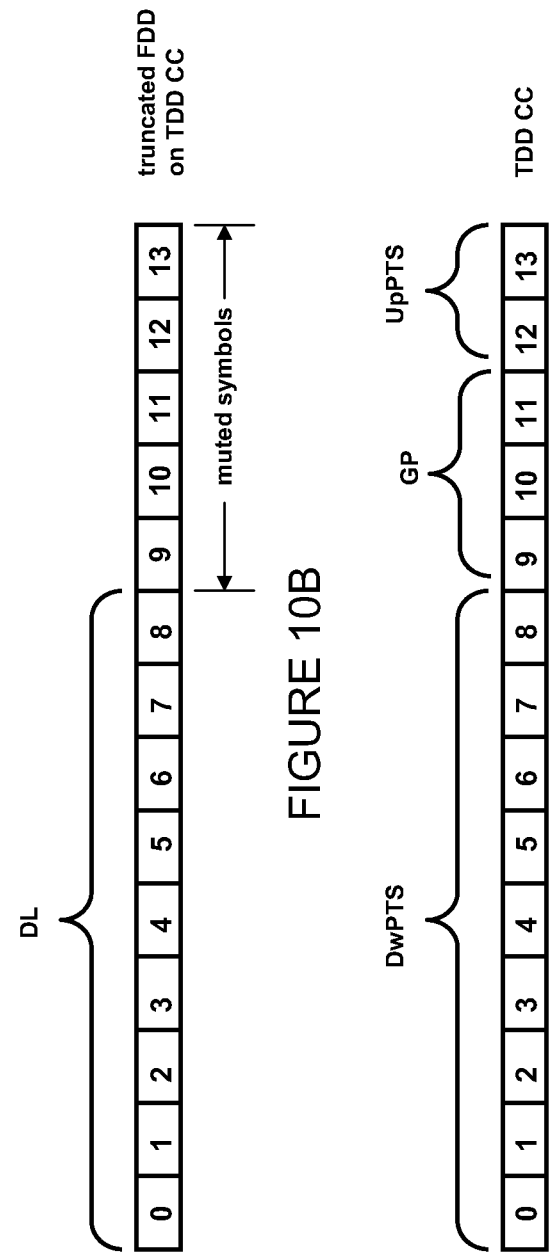

APPARATUS AND METHOD TO REDUCE INTERFERENCE BETWEEN FREQUENCY-DIVISION DUPLEX AND TIME-DIVISION DUPLEX SIGNALS IN A COMMUNICATION SYSTEM

RELATED APPLICATION

This application was originally filed as Patent Cooperation Treaty Application No. PCT/IB2010/055232 filed Nov. 17, 2010.

TECHNICAL FIELD

The present invention is directed, in general, to communication systems and, in particular, to an apparatus, method and system to reduce interference between frequency-division duplex and time-division duplex signals in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/ radio link control/media access control/physical ("PDCP/ RLC/MAC/PHY") sublayers) and control plane (including a radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the communication or radio resource control management, see 3GPP TS 25.331 v.9.1.0 (2009-12) and 3GPP TS 36.331 v.9.1.0 (2009-12), which are incorporated herein by reference.

As wireless communication systems such as cellular telephone, satellite, and microwave communication systems become widely deployed and continue to attract a growing number of users, there is a pressing need to accommodate efficiently a large and variable number of communication devices that transmit an increasing quantity of data within a fixed spectral allocation and limited transmitter power levels. The increased quantity of data is a consequence of wireless communication devices transmitting video information and surfing the Internet, as well as performing ordinary voice communications. Such processes are generally performed while accommodating substantially simultaneous operation of a large number of wireless communication devices.

Significantly enhanced communication services are anticipated to be offered in LTE-A based communication systems by utilization of higher data rates in a communication channel between a user equipment and a base station, with lower latency and reduced cost. Higher data rates can be enabled by carrier aggregation ("CA"), which allows scalable expansion of effective bandwidth delivered to a user equipment through concurrent utilization of communication resources across multiple carriers. The carriers may be of different bandwidths, and may be in the same or different bands. Normal practice in wireless and other communication systems is to deploy a frequency-division duplex ("FDD") system in a frequency-division duplex spectrum, and deploy a time-division duplex ("TDD") system in a time-division duplex spectrum. Then carrier aggregation is performed by either FDD-to-FDD carrier aggregation or by TDD-to-TDD carrier aggregation.

It is now a frequent occurrence, however, that a particular cellular operator may have both frequency-division duplex and time-division duplex spectral allocations and in some countries (e.g., Germany), some operators share portions of the time-division duplex spectrum with other operators. In the time-division duplex spectrum, there is a high likelihood that one operator will choose to operate with a time-division duplex system, but that another operator may use the same spectrum to support frequency-division duplex-capable user equipment.

Additionally with respect to the time-division duplex spectrum, separate time-division duplex carriers on adjacent frequencies should be time synchronized so that uplink and downlink transmissions can occur at the same time. If uplink and downlink transmissions on adjacent time-division duplex carriers occur at the same time, however, then the user equipment performing the uplink transmission may cause interference with another user equipment receiving a downlink transmission on the adjacent time-division duplex carrier. An analogous interference may occur at the base station on uplink and downlink transmissions on adjacent time-division duplex carriers occurring at the same time.

The future LTE-A based communication systems will typically be deployed with frequency-division duplex systems and future variants will incorporate time-division duplex systems. Operators are identifying carriers for the time-division duplex systems. Deploying time-division duplex systems, however, is expensive and introduces interference issues in maintaining frequency separation between carriers. Furthermore, as the initial coverage of such time-division duplex system deployment may be limited, good intersystem handover performance to other systems such as a frequency-division duplex system is necessary to maintain service continuity at border areas that are beyond the planned time-division duplex coverage.

Therefore, it is anticipated that some operators may wish to use time-division duplex spectrum for a frequency-division duplex-capable user equipment by utilizing interband carrier aggregation between a frequency-division duplex downlink ("DL") carrier and a time-division duplex carrier. Additionally, another operator may select a different approach and use time-division duplex spectrum for a time-division duplex system to support time-division duplex-capable user equipment as originally intended. If so, it will become difficult for operators to co-exist because downlink transmissions from an operator using frequency-division duplex carriers for downlink carrier aggregation may interfere with the time-division duplex operator's uplink ("UL") transmissions. Additionally, a time-division duplex uplink transmission from a user equipment may interfere with a frequency-division duplex downlink reception of a user equipment in a time-division duplex spectrum.

Thus, there is need for an improved method and system that can capitalize on the advantages of carrier aggregation with coexistence between time-division duplex and frequency-division duplex systems that avoids the deficiencies of current communication systems.

SUMMARY OF THE INVENTION

These and other problems are generally solved or circumvented, and technical advantages are generally achieved, by embodiments of the present invention, which include an apparatus, method and system to reduce interference between frequency-division duplex and time-division duplex signals in a communication system. In one embodiment, an apparatus includes a processor and memory including computer program code. The memory and the computer program code are configured to, with the processor, cause the apparatus to allocate a time-division duplex carrier for a frequency-division duplex downlink signal for communication with a communication element, and employ the time-division duplex carrier with a truncated time duration for the frequency-division duplex downlink signal.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIGS. 10A to 10C illustrate block diagrams of exemplary implementations of a time-truncated frequency-division duplex downlink subframe in accordance with the principles of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system to reduce interference between frequency-division duplex and time-division duplex signals in a communication system. The apparatus, method and system are applicable, without limitation, to any communication system including existing and future 3GPP technologies such as UMTS, LTE, and its future variants such as 4th generation ("4G") communication systems.

Figure 1:
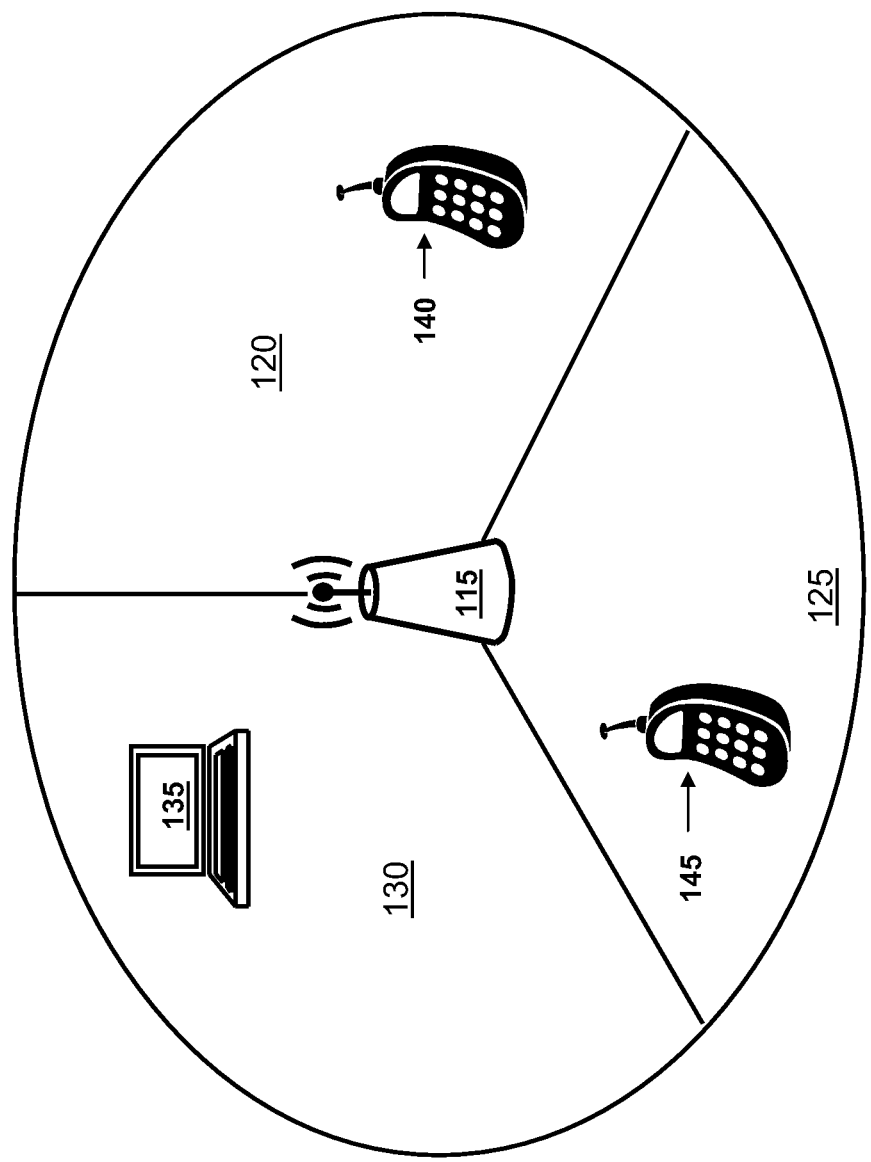
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. The three sectors or more than three sectors are configured per frequency, and one base station 115 can support more than one frequency. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications. Additionally, the wireless communication devices 135, 140, 145 may form communication nodes along with other devices in the communication system.

Figure 2:
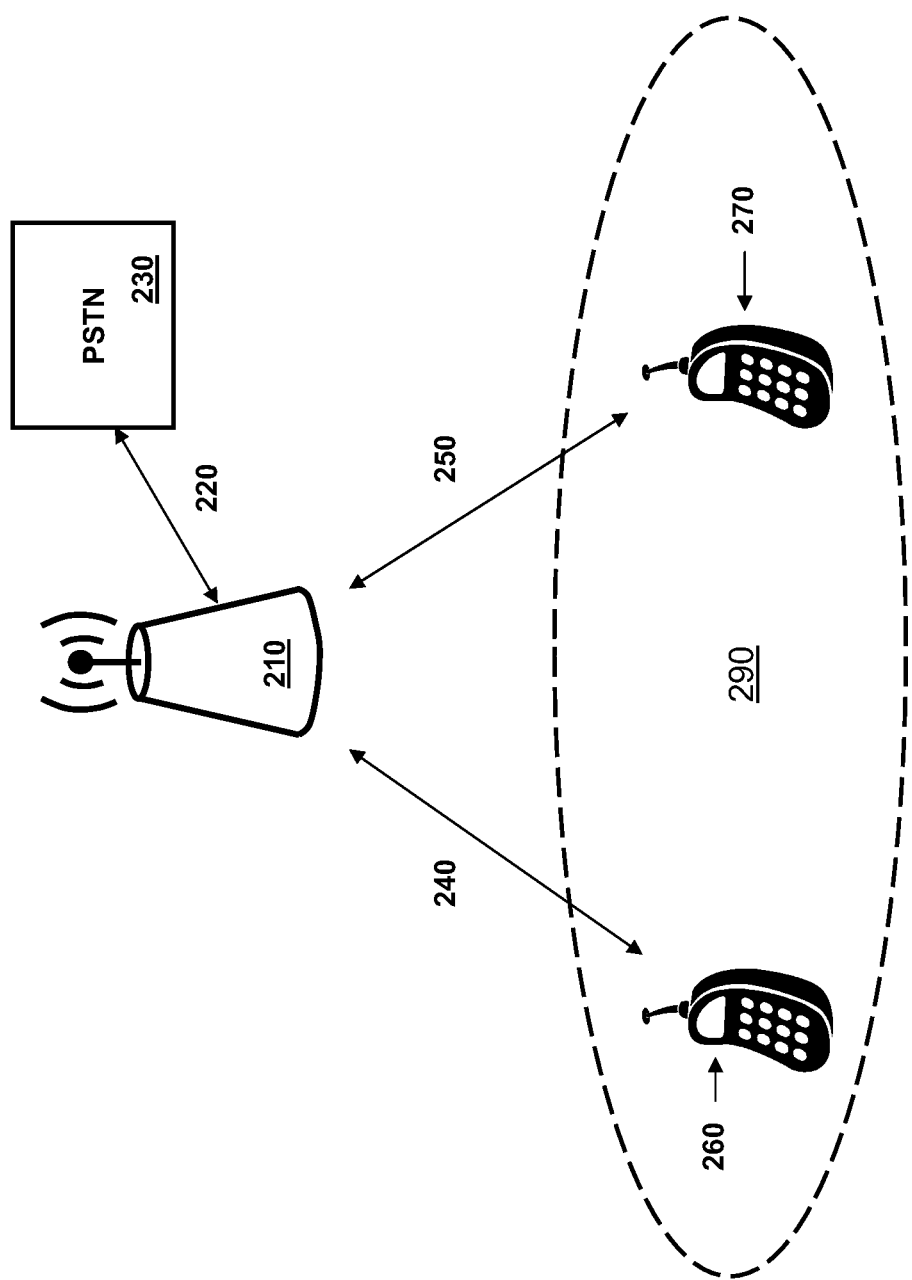

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency-division duplex ("FDD") and/or time-division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications. Additionally, the wireless communication devices 260, 270 may form communication nodes along with other devices in the communication system.

Figure 3:
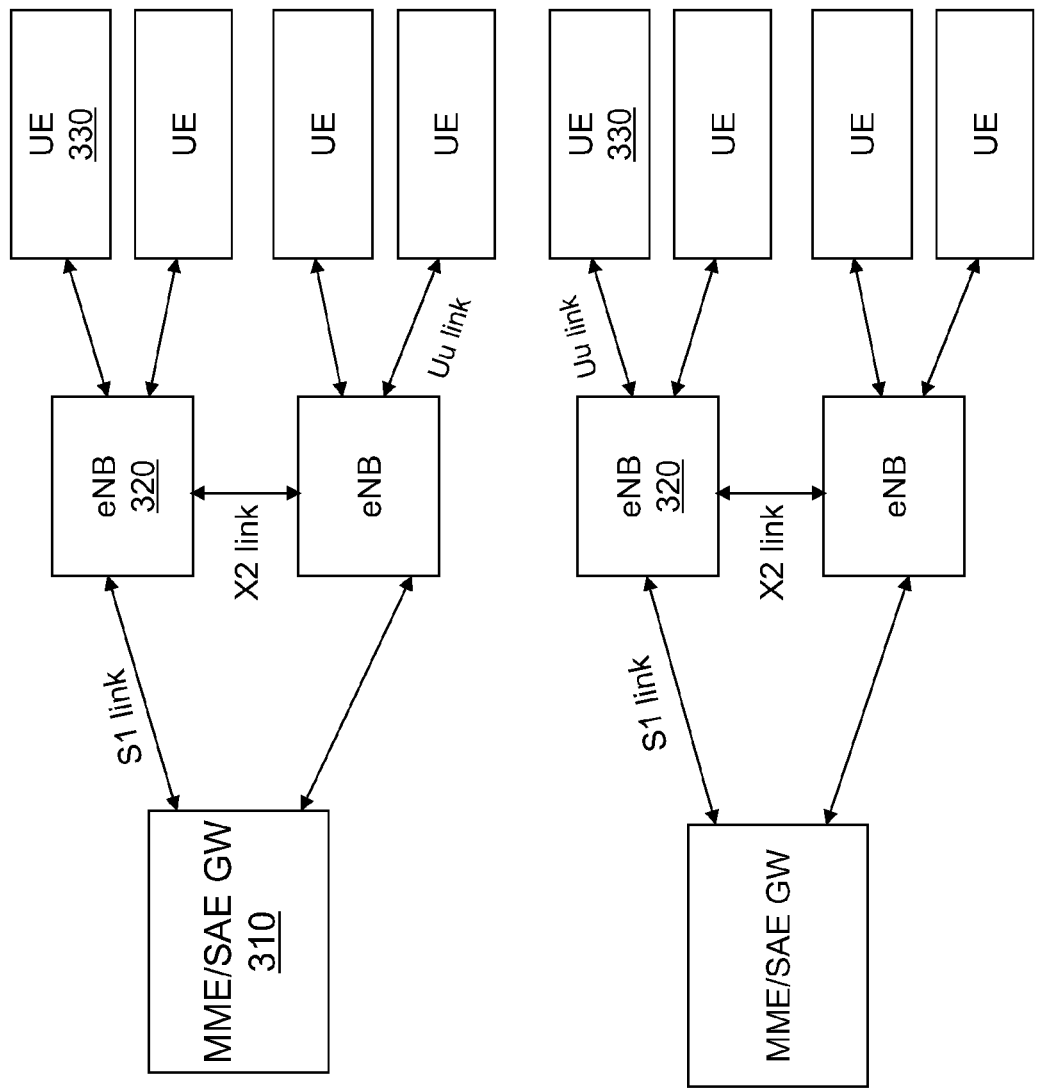
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency communication paths such as coaxial links, or combinations thereof.

The base stations 320 communicate with wireless communication devices such as user equipment ("UE," ones of which are designated 330), which is typically a mobile transceiver carried by a user. Thus, the communication links (designated "Uu" communication links, ones of which are designated "Uu link") coupling the base stations 320 to the user equipment 330 are air links employing a wireless communication signal such as, for example, an orthogonal frequency-division multiplex ("OFDM") signal. While the user equipment 330 are part of a primary communication system, the user equipment 330 and other devices such as machines (not shown) may be a part of a secondary communication system to participate in, without limitation, device-to-device and machine-to-machine communications or other communications. Additionally, the user equipment 330 may form a communication node along with other devices in the communication system.

Figure 4:
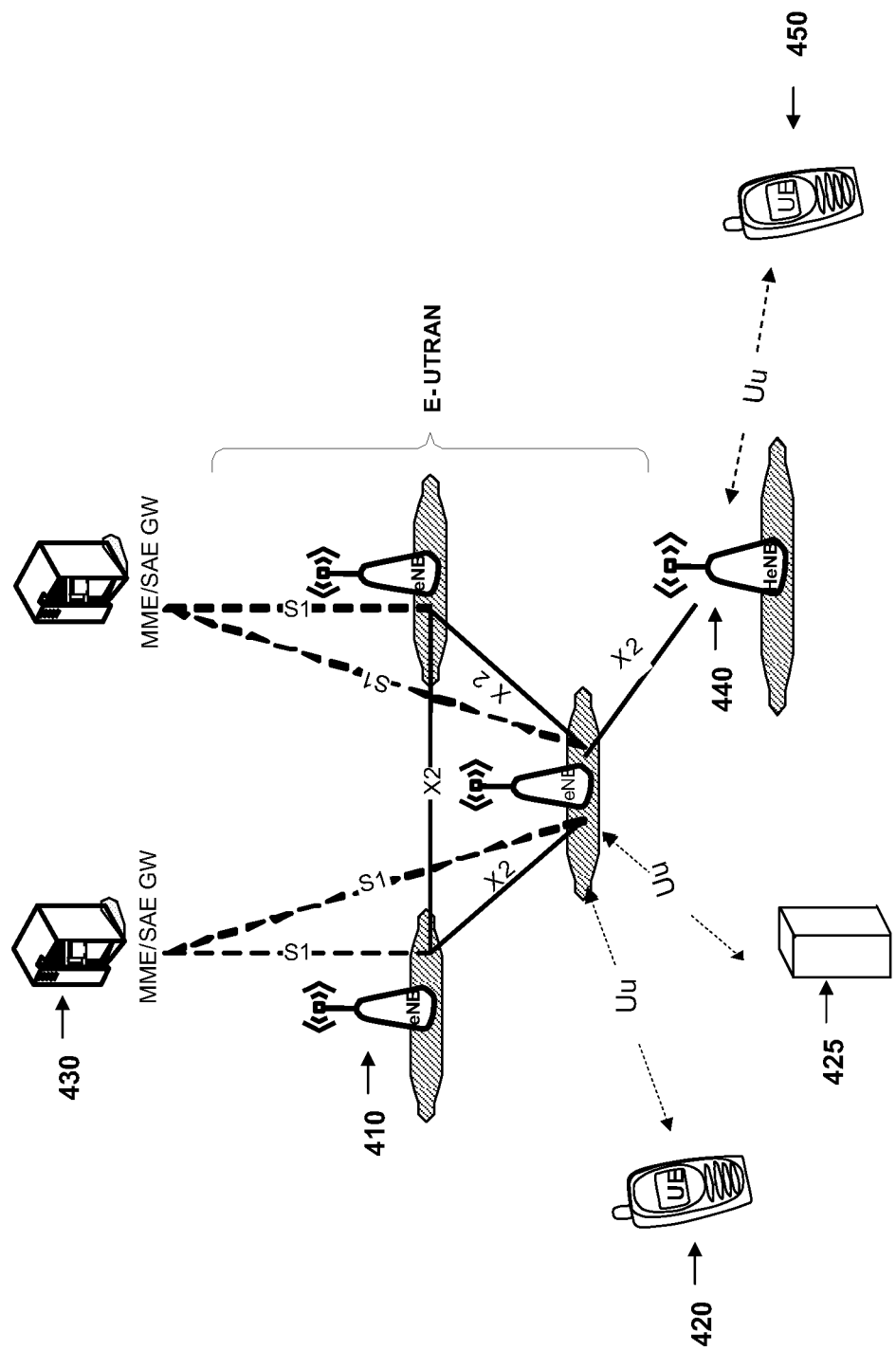

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2") and are connected to the wireless communication devices such as user equipment 420 and other devices such as machines 425 via Uu interfaces or communication links (designated "Uu"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-base station active mode mobility is supported by the mobile management entity/system architecture evolution gateway 430 relocation via the S1 interface.

The base stations 410 may host functions such as radio resource management. For instance, the base stations 410 may perform functions such as Internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 and machines 425 receive an allocation of a group of information blocks from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 450 and machines, or to the home base station 440 for communications (e.g., local or device-to-device communications) within the secondary communication system. The secondary communication resources can overlap with communication resources employed by the base station 410 to communicate with the user equipment 420 within its serving area. For a better understanding of home base stations (designated "HeNB"), see 3 GPP TS 32.781 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, device-to-device and machine-to-machine communications or other communications. Additionally, the user equipment 420 and machines 425 may form communication nodes along with other devices in the communication system.

Figure 5:
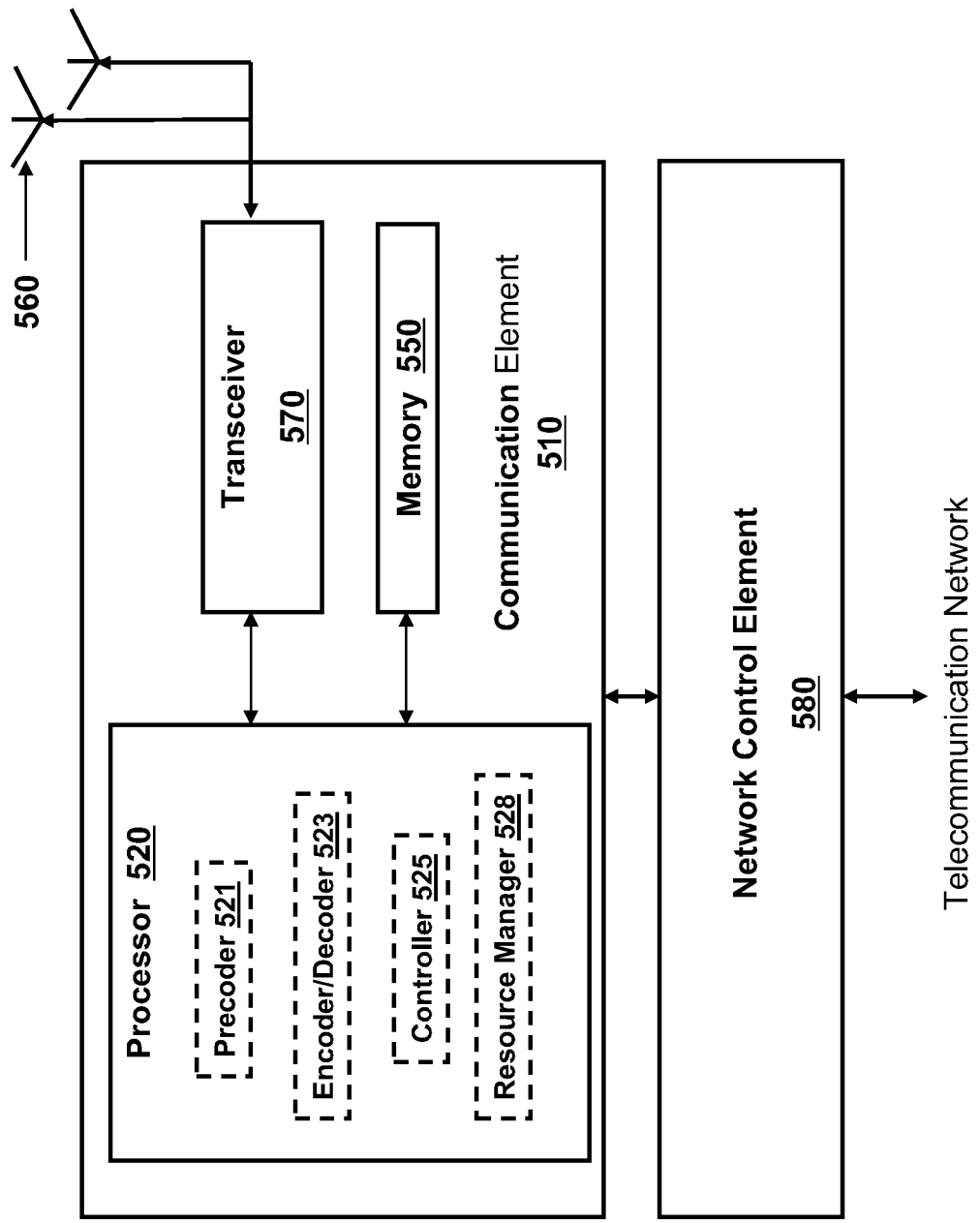
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. Additionally, the communication element or device 510 may form a communication node along with other devices in the communication system. When the communication element or device 510 represents a communication node such as a user equipment, the user equipment may be configured to communicate with another communication node such as another user equipment employing one or more base stations as intermediaries in the communication path (referred to as cellular communications). The user equipment may also be configured to communicate directly with another user equipment without direct intervention of the base station in the communication path. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communications. The communication element 510 may be formed with a plurality of antennas to enable a multiple-input multiple output ("MIMO") mode of operation. The communication element 510 may provide point-to-point and/or point-to-multipoint communication services.

The communication element 510, such as a base station in a cellular communication system or network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communications, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 550, the resource manager 528 is configured to allocate a time-division duplex carrier by a base station for a frequency-division duplex downlink signal for communication with a user equipment, and employ the time-division duplex carrier with a truncated time duration for the frequency-division duplex downlink signal for transmission of voice communications and/or data to/from the communication element 510. Additionally, the resource manager 528 may employ a process by a user equipment to enable reception of a signal from a base station that allocates a time-division duplex carrier for a frequency-division duplex downlink signal transmitted by the base station with truncated time duration, and receive the frequency-division duplex downlink signal with truncated time duration.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna (s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

The conventional solution for coexistence between frequency-division duplex and time-division duplex systems is that all operators employ the same usage for the time-division duplex carriers. In other words, if conventional time-division duplex operation is employed, the communication system uses the same time-division duplex uplink-downlink switching point timing, or else all operators use time-division duplex carriers for downlink only-transmission as additional downlink carriers for frequency-division duplex carrier aggregation. There is no currently known solution for the problem where some operators use time-division duplex carriers for time-division duplex operation, and other operators use an additional downlink carrier for frequency-division duplex downlink carrier aggregation on neighboring frequencies or bands.

Figure 6:
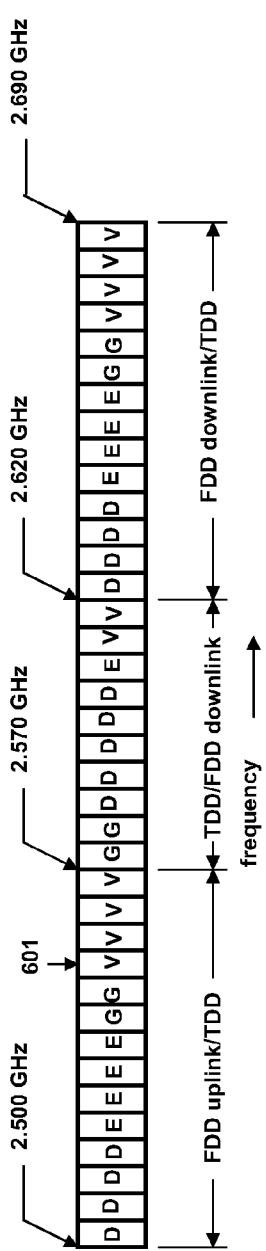
FIG. 6 illustrates a block diagram of an embodiment of a spectrum allocation map that provides an exemplary environment for the application of the principles of the present invention.

Turning now to FIG. 6, illustrated is a block diagram of an embodiment of a spectrum allocation map (e.g., a 2.6 gigahertz) that provides an exemplary environment for the application of the principles of the present invention. The spectrum allocation map demonstrates spectrum acquisitions by the four cellular operators, namely, Telcom Deutschland (designated "D"), E-Plus (designated "E"), Telfonica 02 Germany (designated "G") and Vodafone (designated "V"). Each rectangular block, such as block 601, represents a five megahertz carrier and its associated spectral bandwidth. The frequency-division duplex uplink/downlink spectrum or band and the time-division duplex spectrum or band are shared by the four operators. As illustrated in FIG. 6, a portion of the spectrum is allocated to frequency-division duplex or time-division duplex with frequency-division duplex uplink operation on the lower-frequency portion of the spectrum map, and on the upper-frequency portion of the spectrum map a carrier-by-carrier matching portion to frequency-division duplex or time-division duplex with frequency-division duplex downlink operation. A third, middle portion of the spectrum map is allocated to both downlink time-division duplex and frequency-division duplex operation without matching of uplink and downlink carrier pairs. Since the lower- and upper-frequency portions of the spectrum map contain complementary frequency allocations for each operator, each operator can selectively communicate without interference either with a frequency-division duplex or time-division duplex mode of operation. The middle portion of the spectrum map presents opportunity for interference among the several operators due to the absence of matching uplink and downlink carrier pairs.

Carrier aggregation between frequency-division duplex and time-division duplex system has been considered by Diao Xinxi, Xu Ling, and Ma Zhifeng in the Internet paper entitled "Cooperative Communication Based on Spectrum Aggregation in LTE Further Evolution," ZTE Communications magazine, No. 1 issue in Year 2010, Mar. 21, 2010, zte.com.cn/endata/magazine/ztecommunications/2010Year/No1/articles/201003/t20100321_181534.html, and by E. F. Gormley and C. A. Pralle in U.S. Patent Application Publication No. US2007/0286156A1, entitled "Utilizing Guard band between frequency-division duplex and time-division duplex wireless systems," filed Jun. 6, 2007. The aforementioned publications are incorporated herein by reference.

To resolve potential conflicts between time-division duplex and frequency-division duplex communication arrangements resulting from carrier aggregation, a truncated frequency-division duplex downlink (or uplink) subframe is deployed in a carrier that is ordinarily allocated to time-division duplex operation. An operator that deploys a time-division duplex system continues to use it with conventional time-division duplex operation. An operator that wishes to utilize time-division duplex spectrum for frequency-division duplex-capable user equipment, however, alters (e.g., truncates) the time duration of the subframe that corresponds to the downlink portion (or uplink portion) of a time-division duplex subframe. In this useful downlink (or uplink) truncated time, the operator can continue to use a conventional frequency-division duplex subframe, but with truncated time duration. However, the other, complementary part of the period that is normally an uplink period (or the other portion of the downlink period) is muted or used for device-to-device or local area communication, which operates at a low power level with only a low likelihood of interference. This enables at least partial utilization of the time-division duplex carrier without introducing interference to the frequency-division duplex system.

Figure 7:
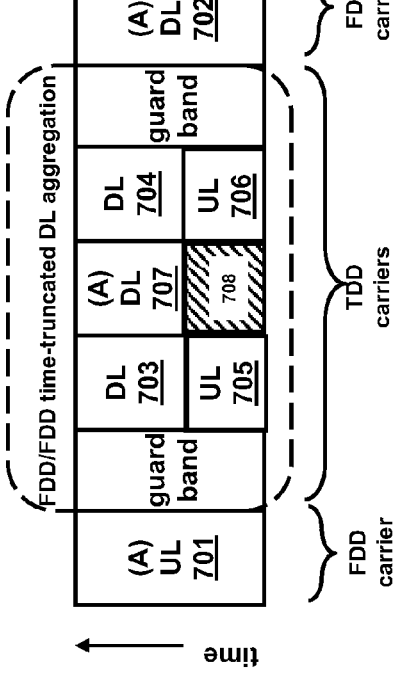
FIG. 7 illustrates a block diagram of an exemplary deployment of a time-truncated frequency-division duplex downlink carrier in a time-division duplex carrier in accordance with the principles of the invention.

Turning now to FIG. 7, illustrated is a block diagram of an exemplary deployment of a time-truncated frequency-division duplex downlink carrier in a time-division duplex carrier (of a time-division duplex spectrum) in accordance with the principles of the invention. The frequency-division duplex user equipment that functions under a cellular operator A (represented in FIG. 7 by the notation "(A)") may receive signals on both frequency-division duplex and time-division duplex carriers. The base station configures the normal frequency-division duplex carrier (illustrated in FIG. 7 as an uplink carrier 701 and a downlink carrier 702) as the primary component carrier ("PCC") and the time-truncated frequency-division duplex system utilizing the time-division duplex carrier (illustrated in FIG. 7 as a downlink time-truncated frequency-division duplex carrier 707 and an uplink complementary time-truncated frequency-division duplex carrier 708) as the secondary component carrier ("SCC") by radio resource control signaling from the base station to the particular user equipment. The time-truncated frequency-division duplex carrier 707 and complementary time-truncated frequency-division duplex carrier 708 are adjacent time-division duplex carriers including downlink and uplink time-division duplex carriers 703, 705, and downlink and uplink time-division duplex carriers 704, 706.

Thus, the base station transmits in the truncated frequency-division duplex downlink case employing a time-truncated frequency-division duplex downlink frame structure that would otherwise be a normal time-division duplex frame structure in the secondary component carrier (e.g., as the time-truncated frequency-division duplex carrier 707). The complementary time-truncated frequency-division duplex carrier 708 (which is a time complementary portion of the time-truncated frequency-division duplex carrier 707) is muted without a matching uplink frequency- or time-division duplex pair to prevent interference with the adjacent uplink time-division duplex carriers 705, 706, and thus appears as a normal time-division duplex carrier to other operators communicating with time-division duplex in the adjacent carriers. If the complementary time-truncated frequency-division duplex carrier 708 is not muted, it could potentially interfere with time-division duplex communication (or signals) in the adjacent carriers. The base station transmits with a downlink duration based on the time-division duplex uplink-downlink configuration in adjacent carriers. The base station does not schedule frequency-division duplex user equipment to transmit in the time-division duplex uplink duration (the complementary time-truncated frequency-division duplex carrier 708), which is overlapped in time with the adjacent uplink time-division duplex carriers 705, 706, and the base station itself does not transmit downlink data as well, as it might interfere with a neighboring carrier. In general, the user equipment is particularly sensitive to interference when receiving a time-division duplex signal in a downlink due to its need to synchronize accurately with time-division duplex carrier frequencies and with time. Such interference degrades the user equipment's ability to make channel measurements.

Figure 8:
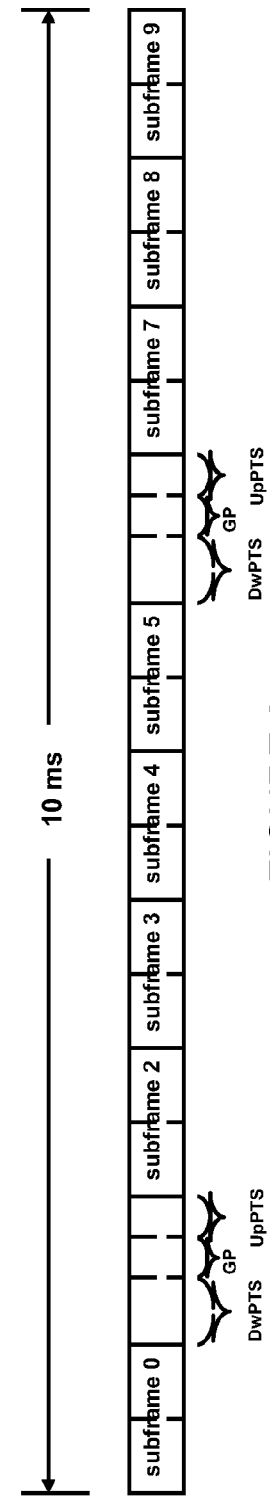
FIG. 8 illustrates a block diagram of an embodiment of a time-division duplex frame structure constructed according to the principles of the present invention.

Turning now to FIG. 8, illustrated is a block diagram of an embodiment of a time-division duplex frame structure constructed according to the principles of the present invention. A time-division duplex (or frequency-division duplex) frame is generally of length ten milliseconds ("ms") and is formed of ten subframes, each of length one millisecond. Two of the time-division duplex subframes are special subframes, each special subframe formed with a downlink pilot time slot ("DwPTS"), a guard period ("GP"), and an uplink pilot time slot ("UpPTS"). The lengths of these special subframe components may be adjusted by the communication system under the constraint that their summed length remains one millisecond.

For these special subframes of a time-division duplex system, a base station may also utilize a truncated frequency-division duplex downlink period corresponding to a downlink pilot time slot in an adjacent time-division duplex component carrier ("CC"), which would require that a frequency-division duplex-capable user equipment understand a new shortened format of the downlink frame. When a base station schedules a downlink frequency-division duplex transmission or re-transmission, the base station should consider availability of the corresponding, but time-limited downlink communication resource in the secondary component carrier, since no transmission should be scheduled in a muted period.

In the time-division duplex spectrum or band, the base station may operate the truncated frequency-division duplex downlink system as a frequency-division duplex system on a secondary component carrier. For example, the base station may send a physical downlink control channel ("PDCCH") communication resource allocation with frequency-division duplex PDCCH format on the truncated frequency-division duplex carrier, assuming a frequency-division duplex secondary synchronization symbol/primary synchronization symbol ("SSS/PSS") location, etc. Naturally the base station may also utilize cross-carrier scheduling from a frequency-division duplex primary carrier to signal a downlink transmission on a time-division duplex carrier to the frequency-division duplex user equipment if so desired.

Subframe blanking is utilized (either by radio resource control configuration or by a media access control command) to enable a user equipment to sleep on and terminate measuring muted subframes of the time-division duplex carrier. By avoiding the user equipment performing measurements during a muted subframe, the user equipment does not corrupt its downlink channel estimations of the time-division duplex carrier by receiving interference from uplink transmissions occurring on other time-division duplex carriers. This way a frequency-division duplex-operable user equipment can produce correct channel estimates of the time-division duplex carrier at the time of the next downlink subframe. In accordance therewith, the user equipment may turn off its receiver and save battery life during the muted subframes, which may be significant especially if the user equipment employs separate radio frequency chains for the time-division duplex reception. If the user equipment does employ separate radio frequency chains for the time-division duplex carrier reception, the user equipment may perform interfrequency/radio access technology measurements during the muted subframes, if necessary.

Figure 9:
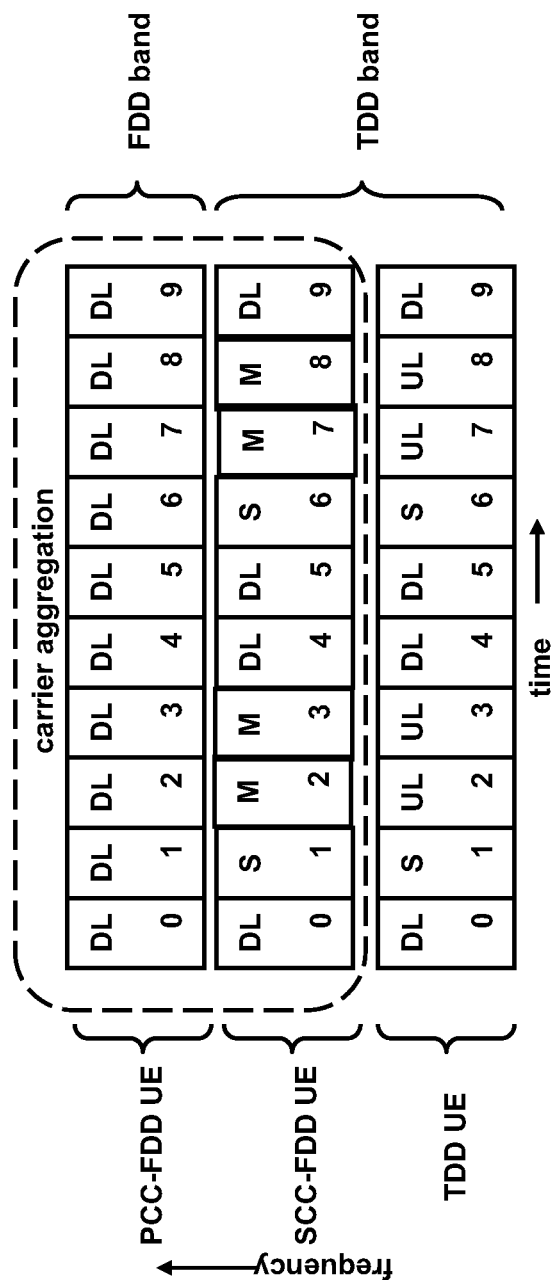
FIG. 9 illustrates a block diagram of an exemplary deployment of a time-truncated frequency-division duplex downlink system in a time-division duplex carrier with a neighboring time-division duplex carrier in accordance with the principles of the present invention.

Turning now to FIG. 9, illustrated is a block diagram of an exemplary deployment of a time-truncated frequency-division duplex downlink system in a time-division duplex carrier with a neighboring time-division duplex carrier in accordance with the principles of the present invention. FIG. 9 illustrates ten time-sequenced subframes in a time-division duplex frame along the horizontal axis, and frequency along the vertical axis. Downlink subframes are identified as "DL," uplink subframes as "UL," special subframes referred to above as "S," and muted uplink subframes as "M." Carrier aggregation is performed across the frequency-division duplex spectrum or band in the top portion of the FIGURE and across the time-division duplex band in the middle portion of the FIGURE. The frequency-division duplex (primary component carrier) downlink subframes in the upper portion of the FIGURE and the time-division duplex frames in the lower portion of the FIGURE are normally configured. In the middle portion of the FIGURE, time-truncated frequency-division duplex downlink carriers are employed in (secondary component carrier) time-division duplex carrier slots. The primary component and secondary component carriers are not necessarily adjacent. Assume the time-division duplex carrier operates as a truncated frequency-division duplex downlink system, and the neighboring time-division duplex carrier operates as a time-division duplex system with an LTE-based time-division duplex configuration as illustrated in FIG. 9. Of course, the system as described herein is not limited to an LTE-based communication system and configuration, and may be, without limitation, a 3G time division synchronous code division multiple access ("TD-SCDMA") communication system and configuration.

For co-existence purposes, time-division duplex carriers among operators employ tight synchronization, which is a normal requirement for time-division duplex operation. Communication between wireless operators is necessary if any time-division duplex configuration and special subframe configuration change is required, though it is most likely that time-division duplex configurations will not change over an extended period of time. To support a frequency-division duplex compatible user equipment, the base station configures a normal frequency-division duplex carrier as the primary component carrier, and the time-division duplex carrier as secondary component carrier for downlink carrier aggregation. In this way, there is a less likely opportunity for interference to or from the neighboring time-division duplex carrier. This enables flexible deployment of spectrum bandwidth among wireless operators.

Turning now to FIGS. 10A to 10C, illustrated are block diagrams of exemplary implementations of a time-truncated frequency-division duplex downlink subframe in accordance with the principles of the present invention. FIG. 10A illustrates an exemplary arrangement of symbols of a normal downlink subframe in frequency-division duplex component carrier ("CC"). FIG. 10B also illustrates an exemplary implementation of a frequency-division duplex-shortened downlink subframe with a length of nine functional downlink symbols, assuming the neighboring time-division duplex component carrier uses LTE-based time-division duplex special subframe configuration "6" that includes nine symbols for downlink pilot time slots ("DwPTS"), two symbols for a guard period ("GP"), and two symbols for uplink pilot time slots ("UpPTS") as illustrated in FIG. 10C. The subframes illustrated in FIG. 10A to 10C represent subframes corresponding to the subframes illustrated in FIG. 9. To accommodate the frequency-division duplex user equipment on the special subframe of a time-division duplex system, the last five symbols of the frequency-division duplex user equipment subframe are muted. Thus, the base station and the frequency-division duplex-capable user equipment understand the new shortened format of the frequency-division duplex downlink frame. Therefore, in the secondary component carrier on the time-division duplex spectrum or band for frequency-division duplex user equipment in FIG. 9, the normal downlink subframe can utilize FIG. 10A format, and the special subframe "S" can utilize FIG. 10B format. Also, the adjacent normal time-division duplex component carrier for a time-division duplex user equipment can utilize FIG. 10C format in the special subframe "S." Besides the solution for a shortened downlink subframe to avoid interference as illustrated in FIG. 10B, the special subframe can be muted (use "M" in the subframe "S" in FIG. 9), or this subframe can be used for device-to-device communication or for local area communication.

Figure 11:
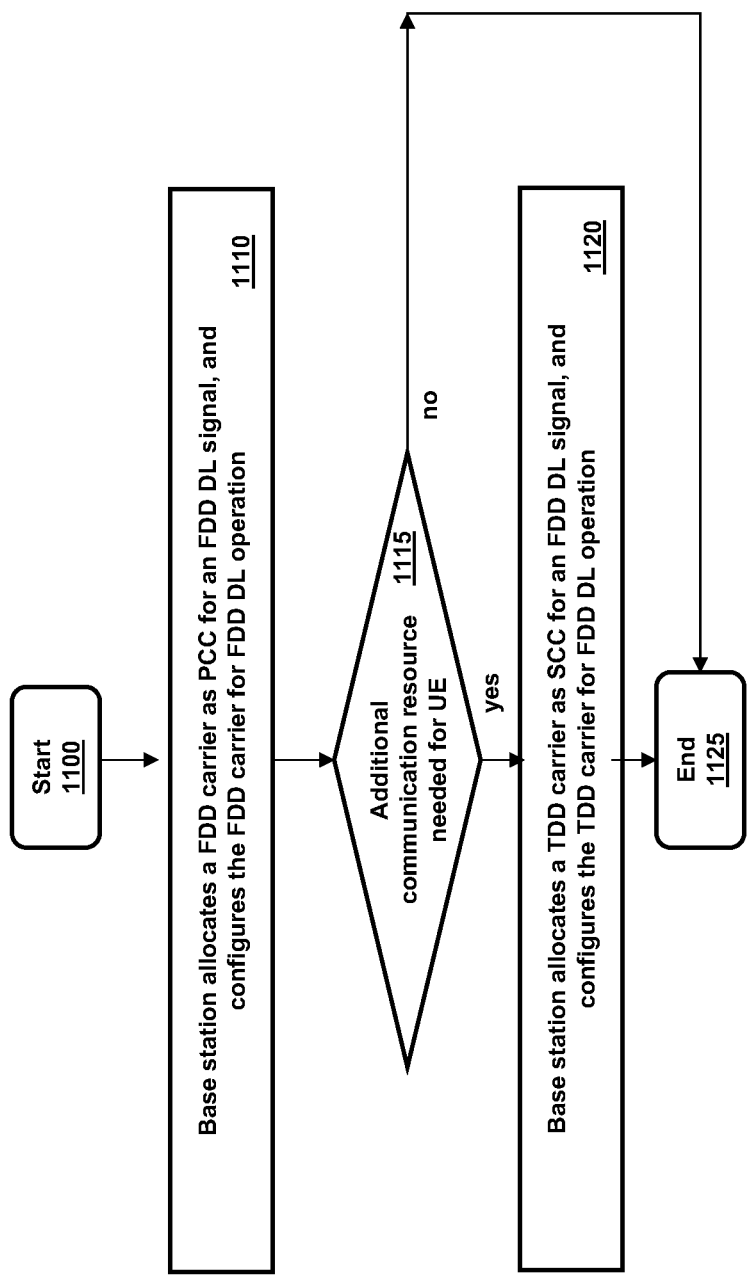
FIGS. 11 and 12 illustrate flowcharts of embodiments of operating a communication element of a communication system in accordance with the principles of the present invention.
Figure 12:
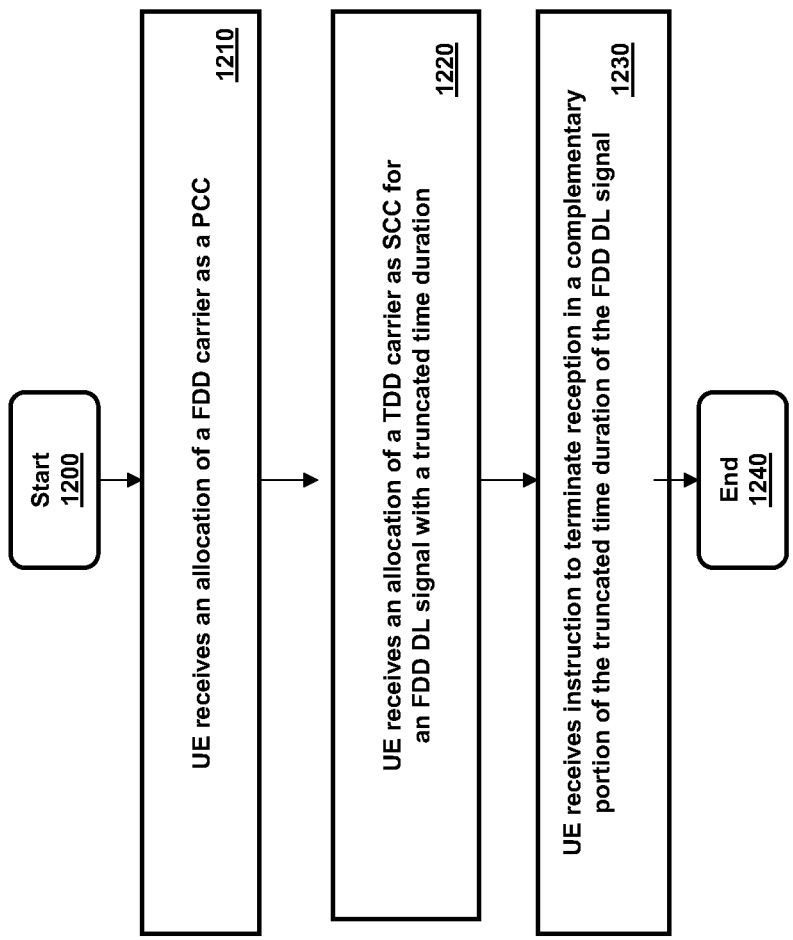

Turning now to FIGS. 11 and 12, illustrated are flowcharts of embodiments of operating a communication element of a communication system in accordance with the principles of the present invention. FIG. 11 illustrates a flowchart of an embodiment of a method of operating a base station to allocate a time-division duplex carrier for a frequency-division duplex downlink signal for communication with a user equipment. The method starts in a step or module 1100. In a step or module 1110, the base station allocates a frequency-division duplex carrier as a primary component carrier for a frequency-division duplex downlink signal, and configures the frequency-division duplex carrier for frequency-division duplex uplink operation.

In step or module 1115, the base station determines if an additional communication resource is needed for the user equipment. If no additional communication resource is needed, the process ends at step 1125. If an additional communication resource is needed, in step or module 1120, the base station allocates a time-division duplex carrier (in a simultaneous time slot of a time-division duplex spectrum) as a secondary component carrier for a frequency-division duplex downlink signal for communication with the user equipment, and configures the time-division duplex carrier for frequency-division duplex downlink operation with truncated time duration by radio resource control signaling. In one embodiment, the base station terminates transmission and signals the user equipment to terminate reception (and thus measurement for synchronization) in a complementary portion of the truncated time duration of the time-division duplex carrier. In another embodiment, the base station may assign a time period for the frequency-division duplex downlink signal to the user equipment corresponding to a downlink pilot time slot in a complementary portion of the truncated time duration in accordance with a special subframe.

Turning now to FIG. 12, illustrated is a flowchart of an embodiment of a method of operating a user equipment to use a time-division duplex carrier to receive a frequency-division duplex downlink signal for communication with a base station. The method starts in a step or module 1200. In step or module 1210, the user equipment receives a radio resource control signal allocating a frequency-division duplex carrier as a primary component carrier, and in response to the radio resource control signal, initiates reception of a frequency-division duplex downlink signal over the frequency-division duplex carrier as the primary component carrier.

In a step or module 1220, the user equipment receives a radio resource control signal from the base station that allocates a time-division duplex carrier (in a simultaneous time slot of a time-division duplex spectrum) as a secondary component carrier for a frequency-division duplex downlink signal with a truncated time duration, and in response to the radio resource control signal initiates simultaneous reception (e.g., in a contemporaneous subframe) of the frequency-division duplex downlink signal with the truncated time duration. In step or module 1230, the user equipment receives a radio resource control signal from the base station to terminate reception in a complementary portion of the truncated time duration, and in response to the radio resource control signal terminates reception in the complementary portion of the truncated time duration. The process ends at step 1240.

The frame formats introduced herein provide flexible spectrum usage for wireless operators that have and utilize both frequency-division duplex and time-division duplex spectra. A wireless operator may use time-division duplex spectrum without high investment cost to complete a time-division duplex system employing carrier aggregation. Full compatibility is maintained with time-division duplex deployments on other carriers on the same band. Forward compatibility is maintained as a wireless operator can introduce a full time-division duplex system later and still continue to use a time-division duplex carrier as a downlink capacity booster for frequency-division duplex user equipment by carrier aggregation. The process can be easily implemented, since it is mainly a new frequency variant for a base station and a frequency-division duplex-capable user equipment if no support for a special subframe is introduced. Supporting special subframes is not a significant development effort.

Thus, an apparatus, method and system are introduced herein to reduce interference between frequency-division duplex and time-division duplex signals in a communication system. In one embodiment, an apparatus (e.g., embodied in a communication element such as a base station) includes a processor and memory including computer program code. The memory and the computer program code are configured to, with the processor, cause the apparatus to allocate a time-division duplex carrier (e.g., as a secondary component carrier) for a frequency-division duplex downlink signal for communication with a communication element (e.g., user equipment), and employ the time-division duplex carrier with a truncated time duration for the frequency-division duplex downlink signal. The memory and the computer program code are also configured to, with the processor, cause the apparatus to generate a signal for the communication element to terminate reception in a complementary portion of the truncated time duration for the frequency-division duplex downlink signal. The memory and the computer program code are also configured to, with the processor, cause the apparatus to allocate a simultaneous frequency-division duplex carrier as a primary component carrier for the communication element. The memory and the computer program code are also configured to, with the processor, cause the apparatus to terminate transmission of the frequency-division duplex downlink signal during a time-division duplex uplink time duration on the time-division duplex carrier. The memory and the computer program code are also configured to, with the processor, cause the apparatus to assign a time period to the communication element corresponding to a downlink pilot time slot in a complementary portion of the truncated time duration for the frequency-division duplex downlink signal. The memory and the computer program code are also configured to, with the processor, cause the apparatus to configure the time-division duplex carrier for time-truncated frequency-division duplex downlink operation by radio resource signaling.

In another aspect, an apparatus (e.g., embodied in a user equipment) includes a processor and memory including computer program code. The memory and the computer program code are configured to, with the processor, cause the apparatus to receive an allocation for a time-division duplex carrier (e.g., as a secondary component carrier) for a frequency-division duplex downlink signal with a truncated time duration from a communication element (e.g., a base station), and receive the frequency-division duplex downlink signal with the truncated time duration. The memory and the computer program code are also configured to, with the processor, cause the apparatus to terminate reception in a complementary portion of the truncated time duration for the frequency-division duplex downlink signal. The memory and the computer program code are also configured to, with the processor, cause the apparatus to receive an allocation of a simultaneous frequency-division duplex carrier as a primary component carrier. The memory and the computer program code are also configured to, with the processor, cause the apparatus to terminate reception of the frequency-division duplex downlink signal during a time-division duplex uplink time duration on the time-division duplex carrier. The memory and the computer program code are also configured to, with the processor, cause the apparatus to receive an assignment of a time period corresponding to a downlink pilot time slot in a complementary portion of the truncated time duration for the frequency-division duplex downlink signal. The memory and the computer program code are also configured to, with the processor, cause the apparatus to receive a configuration of the time-division duplex carrier for time-truncated frequency-division duplex downlink operation by radio resource signaling. Although the apparatus, method and system described herein have been described with respect to cellular-based communication systems, the apparatus and method are equally applicable to other types of communication systems such as a WiMax® communication system.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a processor; and
   memory including computer program code,
   said memory and said computer program code configured to, with said processor, cause said apparatus to perform at least the following:
   allocate a time-division duplex carrier for a frequency-division duplex downlink signal for communication with a communication element, the time-division duplex carrier having a time-division duplex frame structure; and
   employ said time-division duplex carrier with a truncated time duration for said frequency-division duplex downlink signal, wherein the time-division duplex frame structure includes the time truncated frequency-division duplex downlink signal, thereby resolving potential conflicts between time-division duplex and frequency-division duplex communication arrangements resulting from carrier aggregation, wherein the truncated time duration includes muting time duration corresponding to the uplink time-division duplex subframes.

2. The apparatus as recited in claim 1 wherein said memory and said computer program code are further configured to, with said processor, cause said apparatus to generate a signal for said communication element to terminate reception in a complementary portion of said truncated time duration for said frequency-division duplex downlink signal.

3. The apparatus as recited in claim 1 wherein said memory and said computer program code are further configured to, with said processor, cause said apparatus to allocate said time-division duplex carrier as the second component carrier, and a simultaneous frequency-division duplex carrier as a primary component carrier for downlink aggregation.

4. The apparatus as recited in claim 1 wherein said memory and said computer program code are further configured to, with said processor, cause said apparatus to terminate transmission of said frequency-division duplex downlink signal during a time-division duplex uplink time duration on said time-division duplex carrier.

5. The apparatus as recited in claim 1 wherein said memory and said computer program code are further configured to, with said processor, cause said apparatus to configure said time-division duplex carrier for time-truncated frequency-division duplex downlink operation by radio resource signaling.

6. A method, comprising:
    allocating a time-division duplex carrier for a frequency-division duplex downlink signal for communication with a communication element, the time-division duplex carrier having a time-division duplex frame structure; and
    employing said time-division duplex carrier with a truncated time duration for said frequency-division duplex downlink signal, wherein the time-division duplex frame structure includes the time truncated frequency-division duplex downlink signal, thereby resolving potential conflicts between time-division duplex and frequency-division duplex communication arrangements resulting from carrier aggregation, wherein the truncated time duration includes muting time duration corresponding to the uplink time-division duplex subframes.

7. The method as recited in claim 6 further comprising generating a signal for said communication element to terminate reception in a complementary portion of said truncated time duration for said frequency-division duplex downlink signal.

8. The method as recited in claim 6 further comprising allocating a simultaneous frequency-division duplex carrier as a primary component carrier for said communication element.

9. The method as recited in claim 6 further comprising terminating transmission of said frequency-division duplex downlink signal during a time-division duplex uplink time duration on said time-division duplex carrier.

10. An apparatus, comprising:
    a processor; and
    memory including computer program code,
    said memory and said computer program code configured to, with said processor, cause said apparatus to perform at least the following:
        receive an allocation for a time-division duplex carrier for a frequency-division duplex downlink signal with a truncated time duration, the time-division duplex carrier having a time-division duplex frame structure; and
        receive said frequency-division duplex downlink signal with said truncated time duration, wherein the time-division duplex frame structure includes the time truncated frequency-division duplex downlink signal, thereby resolving potential conflicts between time-division duplex and frequency-division duplex communication arrangements resulting from carrier aggregation, wherein the truncated time duration includes muting time duration corresponding to the uplink time-division duplex subframes.

11. The apparatus as recited in claim 10 wherein said memory and said computer program code are further configured to, with said processor, cause said apparatus to perform at least one of the following: terminate reception in a complementary portion of said truncated time duration for said frequency-division duplex downlink signal, and terminate reception of said frequency-division duplex downlink signal during a time-division duplex uplink time division on said time-division duplex carrier.

12. The apparatus as recited in claim 10 wherein said memory and said computer program code are further configured to, with said processor, cause said apparatus to receive an allocation of a simultaneous frequency-division duplex carrier as a primary component carrier.

13. The apparatus as recited in claim 10 wherein said memory and said computer program code are further configured to, with said processor, cause said apparatus to receive a configuration of said time-division duplex carrier for time-truncated frequency-division duplex downlink operation by radio resource signaling.

14. The apparatus as recited in claim 10 wherein said memory and said computer program code are further configured to, with said processor, cause said apparatus to receive said allocation for said time-division duplex carrier as a secondary component carrier.

15. The apparatus as recited in claim 10 wherein the time-division duplex frame structure further includes the time truncated frequency-division duplex downlink signal and a complementary time-truncated frequency-division duplex uplink signal as adjacent time-division duplex carriers, and the complementary time-truncated frequency-division duplex uplink signal is muted or assigned for low power use.

16. A computer program product comprising a program code embedded on a non-transitory a computer readable medium configured to:
    receive an allocation for a time-division duplex carrier for a frequency-division duplex downlink signal with a truncated time duration, the time-division duplex carrier having a time-division duplex frame structure; and
    receive said frequency-division duplex downlink signal with said truncated time duration, wherein the time-division duplex frame structure includes the time truncated frequency-division duplex downlink signal, thereby resolving potential conflicts between time-division duplex and frequency-division duplex communication arrangements resulting from carrier aggregation, wherein the truncated time duration includes muting time duration corresponding to the uplink time-division duplex subframes.

17. A method, comprising:
receiving an allocation for a time-division duplex carrier for a frequency-division duplex downlink signal with a truncated time duration, the time-division duplex carrier having a time-division duplex frame structure; and
receiving said frequency-division duplex downlink signal with said truncated time duration, wherein the time-division duplex frame structure includes the time truncated frequency-division duplex downlink signal, thereby resolving potential conflicts between time-division duplex and frequency-division duplex communication arrangements resulting from carrier aggregation, wherein the truncated time duration includes muting time duration corresponding to the uplink time-division duplex subframes.

18. The method as recited in claim 17 further comprising at least one of the following: terminating reception in a complementary portion of said truncated time duration for said frequency-division duplex downlink signal, and terminating reception of said frequency-division duplex downlink signal during a time-division duplex uplink time duration on said time-division duplex carrier.

19. The method as recited in claim 17 further comprising receiving an allocation of a simultaneous frequency-division duplex carrier as a primary component carrier.

* * * * *